(12) United States Patent
Spesser et al.

(10) Patent No.: US 11,637,505 B2
(45) Date of Patent: Apr. 25, 2023

(54) RECTIFIER ARRANGEMENT

(71) Applicant: Dr. Ing. h.c. F. Porsche Aktiengesellschaft, Stuttgart (DE)

(72) Inventors: Daniel Spesser, Illingen (DE); Tim Pfizenmaier, Leonberg (DE); Florian Mayer, Freiberg am Neckar (DE); Stefan Endres, Reichenschwand (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 97 days.

(21) Appl. No.: 17/381,243

(22) Filed: Jul. 21, 2021

(65) Prior Publication Data

US 2022/0029552 A1    Jan. 27, 2022

(30) Foreign Application Priority Data

Jul. 21, 2020   (DE) ..................... 10 2020 119 105.7

(51) Int. Cl.
   *H02M 7/217*   (2006.01)
(52) U.S. Cl.
   CPC ................... *H02M 7/217* (2013.01)
(58) Field of Classification Search
   CPC ........................ H02M 7/217; H02M 7/2176
   USPC ......................................................... 363/126
   See application file for complete search history.

(56) References Cited

U.S. PATENT DOCUMENTS

| 5,952,812 | A | 9/1999 | Maeda |
| 2010/0220501 | A1 | 9/2010 | Krause |
| 2015/0061606 | A1* | 3/2015 | Pan .......................... H02P 9/008 322/7 |
| 2015/0061607 | A1* | 3/2015 | Pan .......................... H02P 25/22 322/27 |

(Continued)

FOREIGN PATENT DOCUMENTS

| DE | 10 2018 217 599 | 4/2020 |
| DE | 10 2019 106 485 | 9/2020 |

(Continued)

OTHER PUBLICATIONS

German Examination Report dated Nov. 30, 2020.

(Continued)

*Primary Examiner* — Yemane Mehari
(74) *Attorney, Agent, or Firm* — Gerald E. Hespos; Michael J. Porco

(57) ABSTRACT

A rectifier arrangement (20) for rectifying an AC voltage into a DC voltage has connections, circuit arrangements, an interconnection apparatus (26) and an intermediate circuit (50). The connections include first and second connections (22, 21). The intermediate circuit (50) has a first line (51), a second line (52) and at least one capacitor (61, 62) between the first and second lines (51, 52). The circuit arrangements (31, 32, 33, 34, 35, 36) each have a first circuit arrangement connection (A) and a second circuit arrangement connection (B), between which a changeover arrangement (92) and a coil (91) are connected in series. The interconnection apparatus (26) enables at least: a first configuration in which the (Continued)

first connection (22) is connected to at least one first circuit arrangement connection (A), and a second configuration in which the first connection (22) is connected to at least one second circuit arrangement connection (B).

14 Claims, 8 Drawing Sheets

(56) References Cited

U.S. PATENT DOCUMENTS

2020/0295650 A1    9/2020  Spesser et al.

FOREIGN PATENT DOCUMENTS

| EP | 0 660 498 | 6/1995 |
|----|-----------|--------|
| EP | 2 567 857 | 3/2013 |

OTHER PUBLICATIONS

J.C Le Claire—"Double boost effect topology for three-phase AC/DC converter with unity power factor"—2009 13th European Conference on Power Electronics and Applications Year: 2009, Conference Paper, Publisher: IEEE.

* cited by examiner

RECTIFIER ARRANGEMENT

CROSS REFERENCE TO RELATED APPLICATION

This application claims priority under 35 USC 119 to German Patent Appl. No. 10 2020 119 105.7 filed on Jul. 21, 2020, the entire disclosure of which is incorporated herein by reference.

BACKGROUND

Field of the Invention

The invention relates to a rectifier arrangement.

Related Art

US 2015/0061606 A1 discloses a rectifier for generators having different speeds and a plurality of passive rectifiers which are connected in series.

U.S. Pat. No. 5,952,812 A discloses an inductance or coil which is connected in parallel with input connections of a rectifier.

US 2010/0220501 A1 discloses a rectifier which is connected, on the output side, to two inverters which are connected in parallel and each supply an associated transformer.

EP 2 567 857 A1 discloses an interconnection of all phases of a voltage converter by means of a switching mechanism.

EP 0 660 498 A2 discloses a Vienna rectifier and its method of operation.

It is an object of the invention to provide a new rectifier arrangement.

SUMMARY

A rectifier arrangement for rectifying an AC voltage into a DC voltage has connections, circuit arrangements, an interconnection apparatus and an intermediate circuit. The connections comprise firs and second connections. The intermediate circuit has a first line, a second line and at least one capacitor between the first and second lines. The circuit arrangements each have a first circuit arrangement connection and a second circuit arrangement connection. A changeover arrangement and a coil are connected in series between the respective first and second circuit arrangement connections. The order of the changeover arrangement and the coil between the first and second circuit arrangement connections and the associated second circuit arrangement connections of the circuit arrangements is the same in each case. The changeover arrangements are interconnected to the first line and to the second line. The interconnection apparatus is designed to enable at least a first configuration and a second configuration differing from the first configuration. In the first configuration, the first connection is connected to at least one first circuit arrangement connection, and in the second configuration, the first connection is connected to at least one second circuit arrangement connection. The interconnection apparatus therefore enables different configurations between the connections and the circuit arrangements. As a result, the first connection can be connected to a circuit arrangement either in the forward direction or in the reverse direction. Thus, it possible for the interconnection apparatus to connect the first connection to the circuit arrangement at a suitable circuit arrangement connection depending on the connected supply network.

According to one embodiment, the order between the first and second circuit arrangement connections is as follows:
first circuit arrangement connection,
changeover arrangement,
coil,
second circuit arrangement connection.

According to another embodiment, the order between the first and second circuit arrangement connections is as follows:
first circuit arrangement connection,
coil,
changeover arrangement,
second circuit arrangement connection.

The interconnection apparatus may be designed to connect the first connection to plural first circuit arrangement connections in the first configuration, and to connect the first connection to plural second circuit arrangement connections in the second configuration. As a result, the first connection can be connected to a plurality of the circuit arrangements in the forward direction or reverse direction.

The interconnection apparatus may be designed to connect the first connection to no second circuit arrangement connection in the first configuration.

The interconnection apparatus may be designed to connect the first connection to no first circuit arrangement connection in the second configuration.

If the rectifier arrangement is connected to a supply network having a neutral conductor, the efficiency of the circuit arrangement may be different if the neutral conductor is connected on the side of the changeover apparatus or on the side of the coil. Therefore, it may be advantageous to connect the first connection only to one of the circuit arrangement connections.

According to one embodiment, the rectifier arrangement has an even number of circuit arrangements, and the interconnection apparatus is designed to connect the first connection to the second circuit arrangement connections of half of the circuit arrangements in the second configuration. If the rectifier arrangement is connected to a supply network without a neutral conductor, it is advantageous to connect the first connection and preferably also the other connections to half of the circuit arrangements in each case.

According to one embodiment, the interconnection apparatus is designed to connect the second connection either solely to at least one first circuit arrangement connection or solely to at least one second circuit arrangement connection in the first configuration and in the second configuration. This measure makes it possible to reduce the number of switches in the interconnection apparatus since the connections can be connected to predefined circuit arrangement connections irrespective of the configuration. A reduction in the number of switches reduces the electrical resistance, reduces the losses, increases efficiency, and reduces the costs for switches.

The circuit arrangements may have at least two first circuit arrangements and at least two second circuit arrangements. The second circuit arrangement connections of the first circuit arrangements may be connected electrically to one another at a first point, and the second circuit arrangement connections of the second circuit arrangements may be connected electrically to one another at a second point. The interconnection apparatus may be designed to enable either an electrical connection of the first point and the second point or a disconnection of this electrical connection, thereby reducing the number of switches in the interconnection apparatus.

In one embodiment, the rectifier arrangement has at least six circuit arrangements, and the connections comprise a third connection and a fourth connection. Most configurations for single-phase and three-phase supply networks can be implemented using six circuit arrangements, but additional circuit arrangements are possible.

According to one embodiment, the interconnection apparatus is designed to enable a third configuration that corresponds to the first configuration. In this embodiment, the first, second and third connections are connected respectively to at least two first circuit arrangement connections. The fourth connection is connected to at least six second circuit arrangement connections. In this case, the third configuration may correspond to the single second configuration, or a further configuration that differs from the third configuration may be possible. This configuration is advantageous when connecting a multi-phase supply network having a neutral conductor.

According to one embodiment, the interconnection apparatus is designed to enable a fourth configuration that corresponds to the second configuration. In this embodiment, the first connection and the third connection are connected to in each case at least three first circuit arrangement connections, and the second connection and the fourth connection are connected in each case to at least three second circuit arrangement connections. In this case, the fourth configuration may correspond to the single second configuration, or a further configuration that is based on the second configuration and differs from the fourth configuration may additionally be possible. This configuration is advantageous when connecting a single-phase supply network having two phases that are phase-shifted through 180°.

According to one embodiment, the changeover apparatus has a first changeover apparatus connection and a second changeover apparatus connection and is designed to enable a current from the first changeover apparatus connection or from the second changeover apparatus connection to the first line, to enable a current from the second line to the first changeover apparatus connection or to the second changeover apparatus connection, to prevent a current between the first changeover apparatus connection and the second changeover apparatus connection in a first changeover apparatus state, and to enable a current between the first changeover apparatus connection and the second changeover apparatus connection in a second changeover apparatus state.

A current controller for controlling the current flowing through the changeover apparatus may be assigned respectively to the changeover apparatuses. This makes it possible to limit the maximum current at the connections.

According to one embodiment, the changeover arrangement has a diode and a semiconductor switch reverse-connected in parallel with the diode to enable a current flow in one direction via the diode and to enable a current flow in an opposite, second direction via the semiconductor switch. The diode may be a Schottky diode. The semiconductor switch makes it possible to increase the efficiency.

According to one embodiment, the interconnection apparatus is in the form of an interconnection matrix to enable, in addition to the first configuration and the second configuration, at least one further different configuration, preferably at least two further different configurations. Interconnection matrices enable largely freely selectable configurations by virtue of a multiplicity of switches and result in a rectifier arrangement which can be used in a versatile manner.

Further details and advantageous refinements of the invention will emerge from the exemplary embodiments described below and illustrated in the drawings, which embodiments should in no way be understood as restricting the invention, and also from the dependent claims.

DETAILED DESCRIPTION

Figure 1:
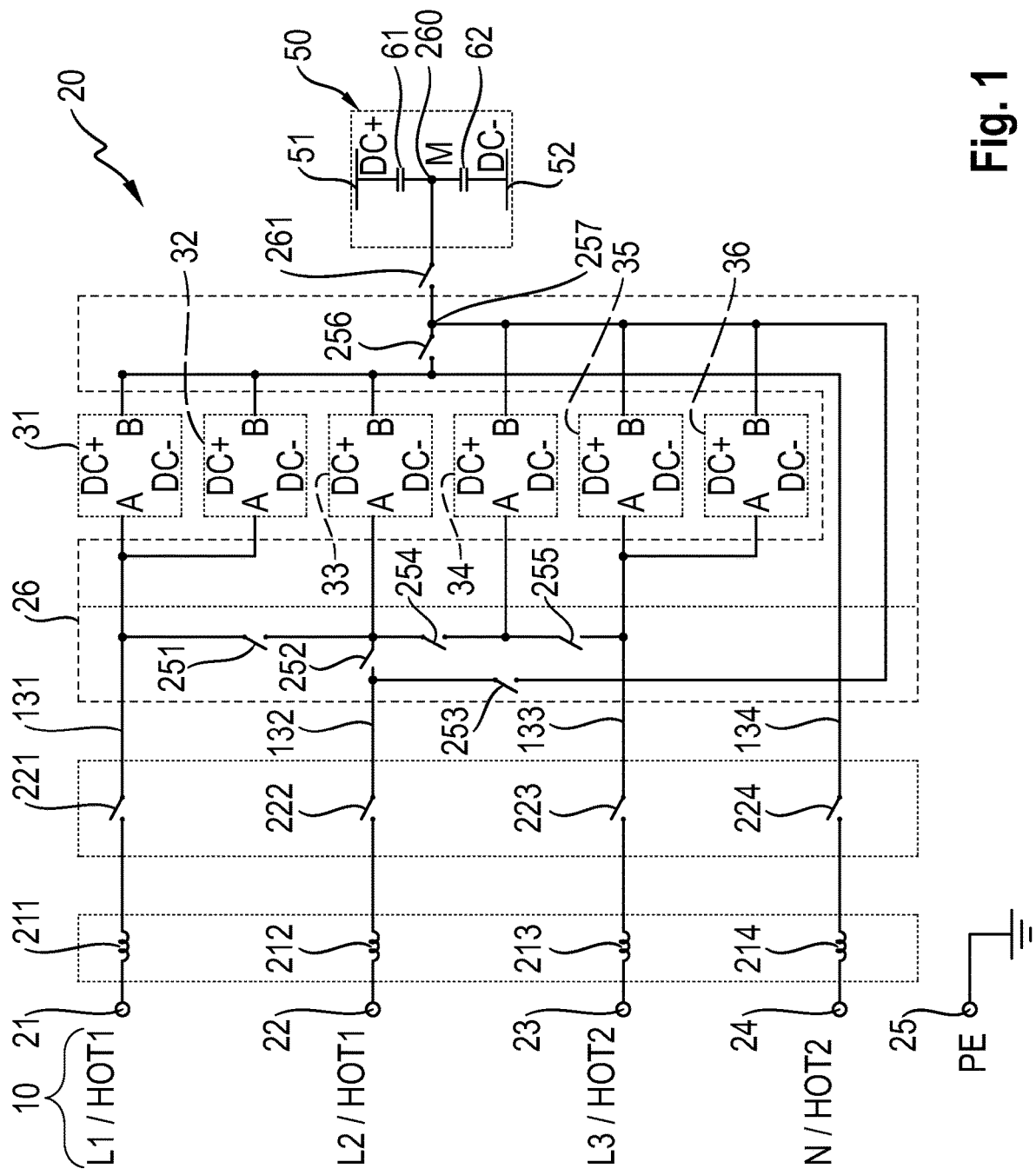
FIG. 1 shows a rectifier arrangement having circuit arrangements and an interconnection apparatus.

The figures will be described in an interrelated and overarching manner. The same reference numerals denote the same elements and these elements are usually described only once.

FIG. 1 shows a rectifier arrangement 20 for rectifying an AC voltage into a DC voltage. The rectifier arrangement 20 has connections 21, 22, 23, 24 and 25, via which the rectifier arrangement can be connected to a supply network 10. The connections 21, 22, 23 and 24 may also be referred to as rectifier arrangement connections, and the connection 25 may be referred to as a protective conductor connection for connection to a protective conductor PE. In the exemplary embodiment, the rectifier arrangement 20 has six circuit arrangements 31, 32, 33, 34, 35 and 36 each having a first circuit arrangement connection A and a second circuit arrangement connection B. The rectifier arrangement 20 has a DC intermediate circuit 50 having a first line 51 (DC+), a second line 52 (DC−) and at least one capacitor 61, 62 between the first line 51 and the second line 52. The first line 51 and the second line 52 are each connected to the circuit arrangements 31 to 36, and this is indicated by the designation DC+ and DC− in the circuit arrangements.

The connection 21 is connected to a point 131 via an interference suppression choke 211 and a switch 221. The connection 22 is connected to a point 132 via an interference suppression choke 212 and a switch 222. The connection 23 is connected to a point 133 via an interference suppression choke 213 and a switch 223. The connection 24 is connected to a point 134 via an interference suppression choke 214 and a switch 224. The interference suppression chokes 211, 212, 213 and 214 are used as filters for radio-frequency interference signals. The switches 221, 222, 223 and 224 make it possible to disconnect the rectifier arrangement 20 from the supply network 10. Both the interference suppression chokes and the switches 221 to 224 are not absolutely necessary. The interconnection apparatus has switches 251, 252, 253, 254, 255 and 256.

The point 131 is connected to the first circuit arrangement connections A of the circuit arrangements 31 and 32 and is connected, via a switch 251, to the first circuit arrangement connection A of the circuit arrangement 33.

The point 132 is connected, via a switch 252, to the first circuit arrangement connection A of the circuit arrangement 33 and is connected to a point 257 via a switch 253.

The first circuit arrangement connection A of the circuit arrangement 33 is connected, via a switch 254, to the first circuit arrangement connection A of the circuit arrangement 34.

The first circuit arrangement connection A of the circuit arrangement 34 is connected to the point 133 via a switch 255.

The point 133 is connected to the first circuit arrangement connections A of the circuit arrangements 35 and 36.

The point 134 is connected to the second circuit arrangement connections B of the circuit arrangements 31, 32 and 33.

The point 257 is connected to the second circuit arrangement connections B of the circuit arrangements 34, 35 and 36. The point 257 is additionally connected to the point 134 via a switch 256.

The first line 51 is connected to a point 260 via the capacitor 61, and the point 260 is connected to the line 52 via the capacitor 62. The capacitors 61, 62 are also referred to as intermediate circuit capacitors. The point 260 is connected to the point 257 via a switch 261.

Figure 2:
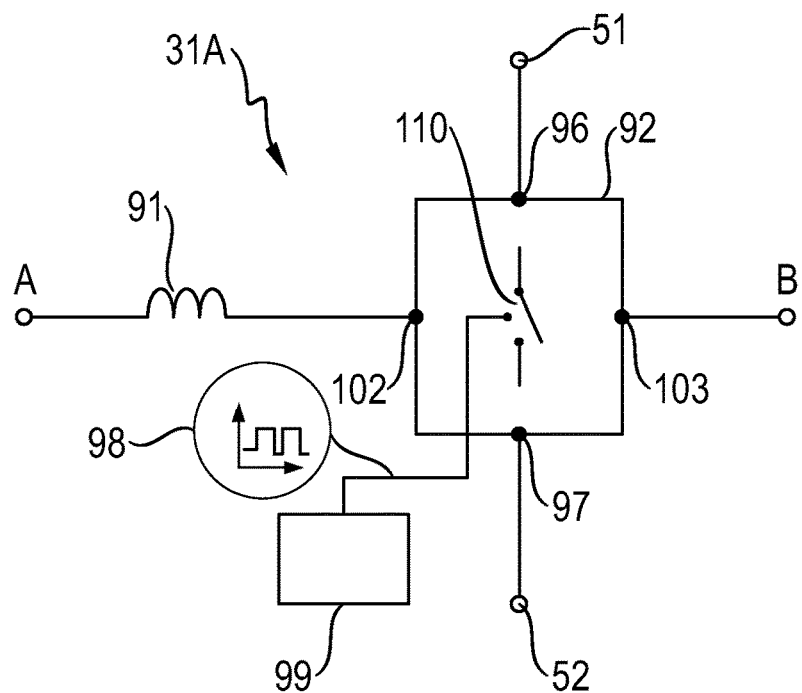
FIG. 2 shows a first embodiment for a circuit arrangement of the rectifier arrangement of FIG. 1 having a changeover arrangement.

FIG. 2 shows a first exemplary embodiment 31A of the circuit arrangement 31. A coil 91 and a changeover arrangement 92 are connected in series between the first circuit arrangement connection A and the second circuit arrangement connection B. The order between the first circuit arrangement connection A and the second circuit arrangement connection B is as follows:
first circuit arrangement connection A
coil 91
changeover arrangement 92
second circuit arrangement connection B.

The changeover arrangement 92 has a connection 102, a connection 103, a connection 96 and a connection 97. The connection 102 is connected to the coil 91, the connection 103 is connected to the second circuit arrangement connection B, the connection 96 is connected to the line 51 and the connection 97 is connected to the line 52.

The changeover arrangement 92 has—schematically indicated—a switch 110 which enables different interconnections between the connections 102, 103, 96 and 97.

A control apparatus 99 is provided for the purpose of commutating the rectifier arrangement 20 and makes it possible—schematically indicated—to supply a clocked signal 98, for example.

Figure 3:
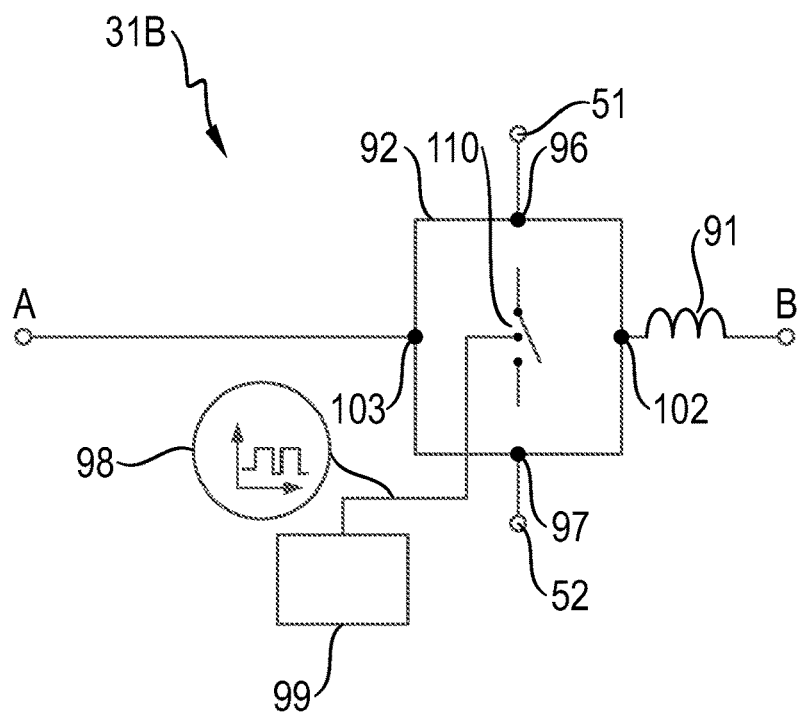
FIG. 3 shows a second embodiment for a circuit arrangement of the rectifier arrangement of FIG. 1 having a changeover arrangement.

FIG. 3 shows a further embodiment 31B of the circuit arrangement 31, in which the order of the coil 91 and the changeover arrangement 92 is swapped. The order is therefore as follows:
first circuit arrangement connection A
changeover arrangement 92
coil 91
second circuit arrangement connection B.

Either all circuit arrangements 31 to 36 are preferably designed like the circuit arrangement 31A or all circuit arrangements 31 to 36 are designed like the circuit arrangement 31B.

The control apparatus 99 from FIG. 2 and FIG. 3 preferably has an integrated current controller. As a result, the current in the circuit arrangements 31 to 36 can be controlled, and the current flowing via the respective connections 21, 22, 23, 24 of FIG. 1 is thereby also limited to the sum of the controlled currents.

Figure 4:
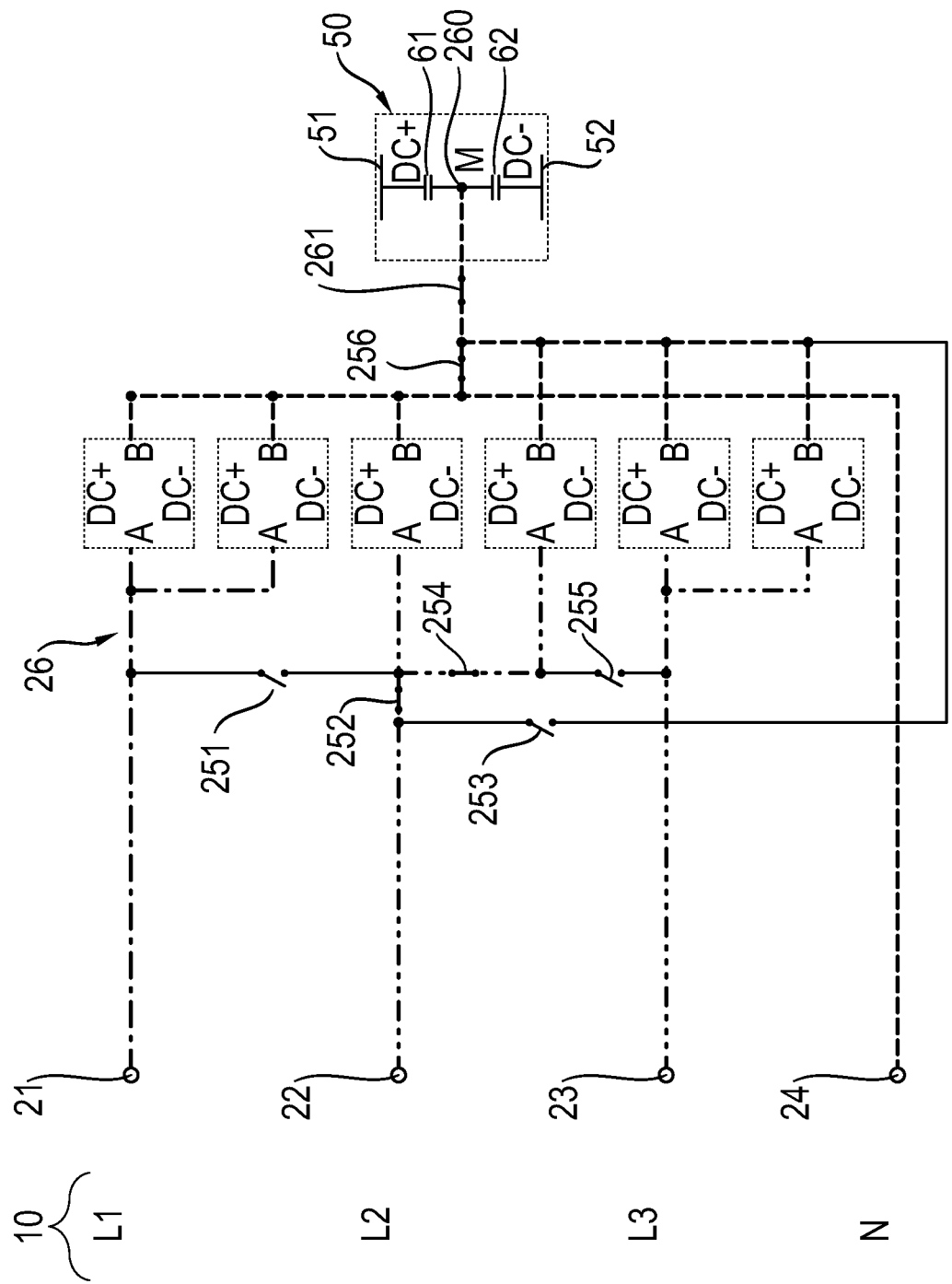
FIG. 4 shows a first configuration of the interconnection apparatus of FIG. 1.

FIG. 4 shows, by way of example, a possible connection of a European three-phase supply network, in which the active conductors of the supply network 10 have the phases L1, L2, L3 and a neutral conductor N. The phase L1 is connected to the connection 21, the phase L2 is connected to the connection 22 and the phase L3 is connected to the connection 23. The neutral conductor N is connected to the connection 24.

The interconnection apparatus 26 is interconnected as follows:

The switch 252, the switch 254 and the switch 256 are turned on, and the switches 251, 253 and 255 are turned off.

As a result of this configuration, the connection 21 is connected to the first circuit arrangement connections A of the circuit arrangements 31 and 32, the second connection 22 is connected to the first circuit arrangement connections A of the circuit arrangements 33 and 34, the connection 23 is connected to the first circuit arrangement connections A of the circuit arrangements 35 and 36, and the connection 24 is connected to the second circuit arrangement connections B of all circuit arrangements 31, 32, 33, 34, 35 and 36.

The switch 261 is not part of the interconnection apparatus 26. The point 260 of the intermediate circuit 50 is connected to the connection 24 and therefore to the neutral conductor N via the switch 261 which is turned on. This results in a lower fluctuation of the potential at the point 260. The point 260 is thereby set to the potential of the neutral conductor N, and the voltage at the capacitors 61, 62, which is for example 800 V between the lines 51 and 52, is kept at +/−400 V with respect to the potential on the neutral conductor N. As a result, in the case of an insulation fault, the maximum voltage is kept comparatively low with respect to the potential on the neutral conductor N, and this improves safety. The rectifier arrangement 20 would also function without the switch 261.

During rectification, the current flows mainly between the phases L1, L2 and L3 at the connections 21 to 23. In contrast, no current or only a low current flows via the neutral conductor N at the connection 24, for example in the case of a network imbalance. In the case of a three-phase supply network with a maximum power of 22 kW, a current of at most 32 A can respectively flow via the connections 21, 22 and 23, for example.

Figure 5:
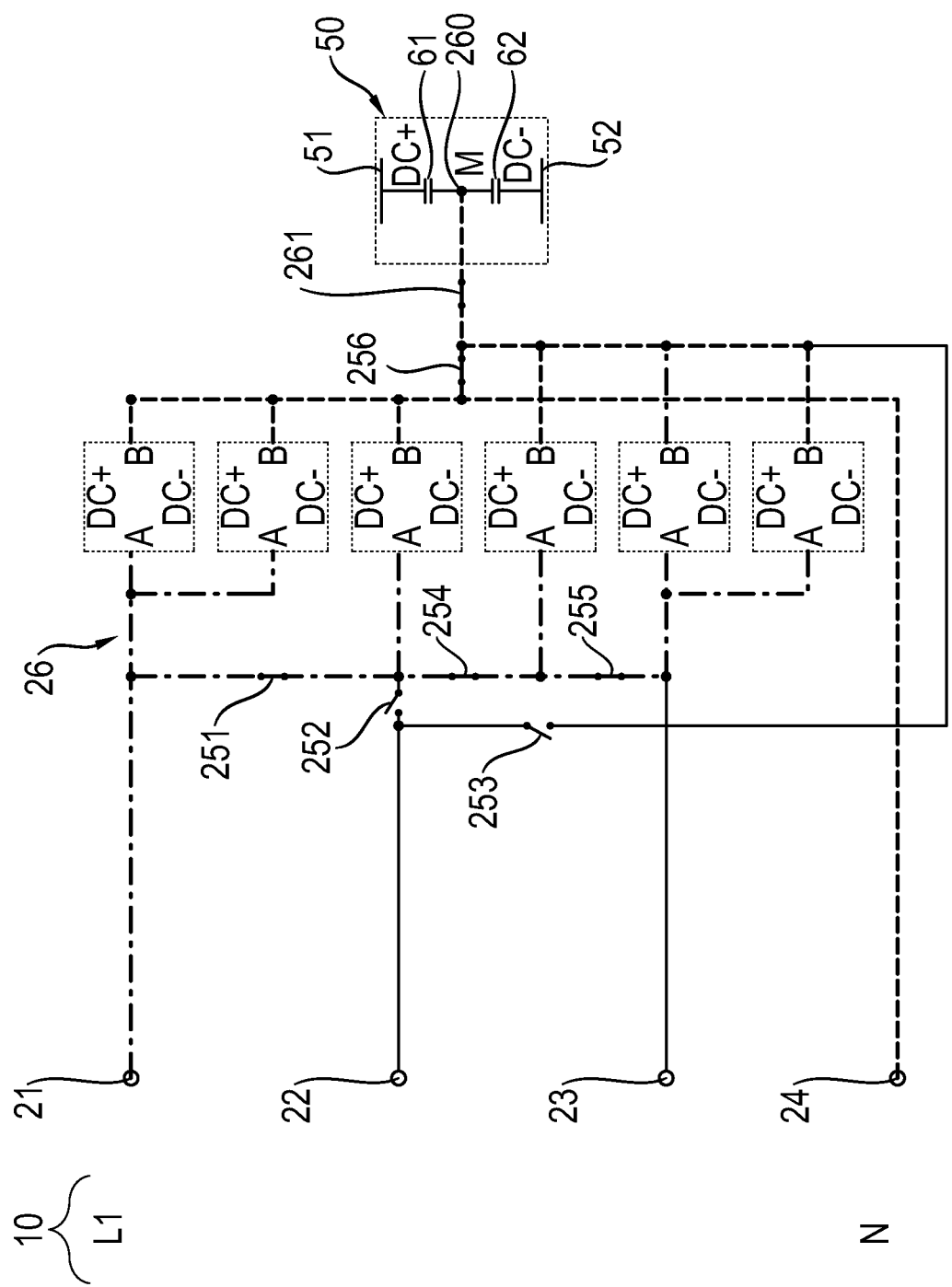
FIG. 5 shows a second configuration of the interconnection apparatus of FIG. 1.

FIG. 5 shows, by way of example, the connection of a European single-phase network having a phase L1 and a neutral conductor N. The phase L1 is connected to the connection 21, and the neutral conductor N is connected to the connection 24. The selected configuration is as follows:

The switches 251, 254, 255 and 256 are turned on, and the switches 252 and 253 are turned off.

As a result, the connection 21 is connected to the first circuit arrangement connections A of all circuit arrangements 31 to 36, and the connection 24 is connected to all second circuit arrangement connections B of all circuit arrangements 31 to 36.

As a result, all circuit arrangements 31 to 36 can be used for rectification, and this reduces the load on the individual circuit arrangements 31 to 36.

The switch 261 is turned on to connect the neutral conductor N to the point 260. This can vary depending on the operating point.

In the case of a single-phase supply network having a maximum power of 11 kW, a maximum current of 48 A respectively flows both via the connection 21 and via the connection 24.

Figure 6:
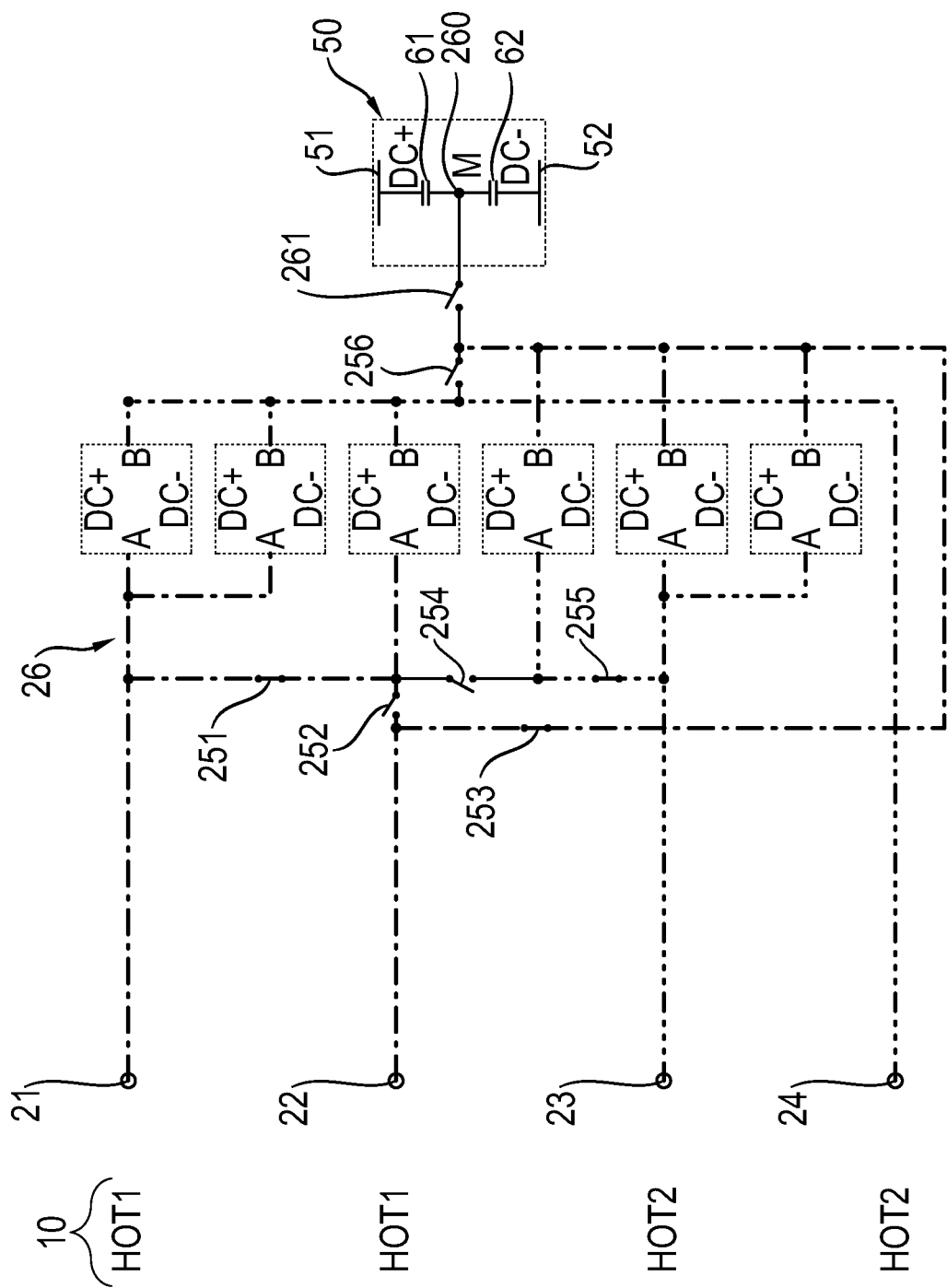
FIG. 6 shows a third configuration of the interconnection apparatus of FIG. 1.

FIG. 6 shows the connection of a supply network 10 of the US split phase type which is a single-phase network having two active conductors, a first phase of which is referred to as HOT1 and a second phase of which is referred to as HOT2. The phase HOT2 has a phase shift of 180° with respect to the phase HOT1. This is therefore not a three-phase network.

In this case, the interconnection apparatus 26 is configured as follows:

The switches 251, 253 and 255 are turned on, and the switches 252, 254 and 256 are turned off.

As a result, the connection 21 is connected to the first circuit arrangement connections A of the circuit arrangements 31, 32 and 33, the connection 22 is connected to the second circuit arrangement connections B of the circuit arrangements 34, 35 and 36, the connection 23 is connected to the first circuit arrangement connections A of the circuit arrangements 34, 35 and 36, and the connection 24 is connected to the second circuit arrangement connections B of the circuit arrangements 31, 32 and 33.

As a result, each of the four connections 21, 22, 23, 24 is connected either to three first circuit arrangement connections A or to three second circuit arrangement connections B. In the exemplary embodiment, the phase HOT1 can be connected to the connections 21 and 22, and the phase HOT2 can be connected to the connections 23 and 24. In this case, it can be seen that the phase HOT1 is routed to the first circuit arrangement connections A via the connection 21 and is routed to the second circuit arrangement connections B via the connection 22. The circuit arrangements 31, 32 and 33 are therefore used in the opposite direction to the circuit arrangements 34, 35 and 36. This can also be referred to as inverse use of some of the circuit arrangements. This control produces new possibilities since, on account of the different position of the coils 91, the first line 51 can be supplied via some of the circuit arrangements and the line 52 can be supplied via the other circuit arrangements, for example during a positive half-cycle of the phase HOT1. This makes it possible to considerably reduce the ripple currents in the DC intermediate circuit 50. Such a configuration of the circuit arrangements and of the connections by means of the interconnection apparatus produces a so-called Weissach rectifier.

In experiments, it was determined that the voltage ripple of the rectifier 20 in the DC intermediate circuit 50 in the case of the US split phase supply network in the configuration in FIG. 6 is approximately 27% of the voltage ripple of a corresponding Vienna rectifier without reversing some of the circuit arrangements 31 to 36.

The switch 261 is turned off since a neutral conductor N is not available.

In the case of a single-phase three-conductor supply network, for example of the US split phase type, having a maximum power of 19.2 kW, a maximum current of 40 A results at the connections 21 and 22 and a maximum current of 40 A results at the connections 24 and 23 in each case.

This is advantageous, in particular, over an alternative interconnection of the connection 21 to the connection 22 and an interconnection of the connection 23 to the connection 24. In the case of such an interconnection, the maximum current at the connections 21 and 22 would together be 80 A and the maximum current at the connections 23 and 24 would likewise together be 80 A. However, it would not be ensured that there is a symmetrical current distribution between the individual connections owing to different resistances and a different number of switches, for example. Therefore, the situation could arise, for example, in which a current of 70 A flows via the connection 21 and a current of 10 A flows via the connection 22. The connections 21, 22, 23, 24 would therefore have to be designed for higher maximum currents, and this is technically more complicated and more expensive or would result in overloading of a phase. In contrast, the maximum current is guaranteed to be no higher than 40 A by virtue of the separation of the current paths according to the exemplary embodiment in FIG. 6.

Figure 7:
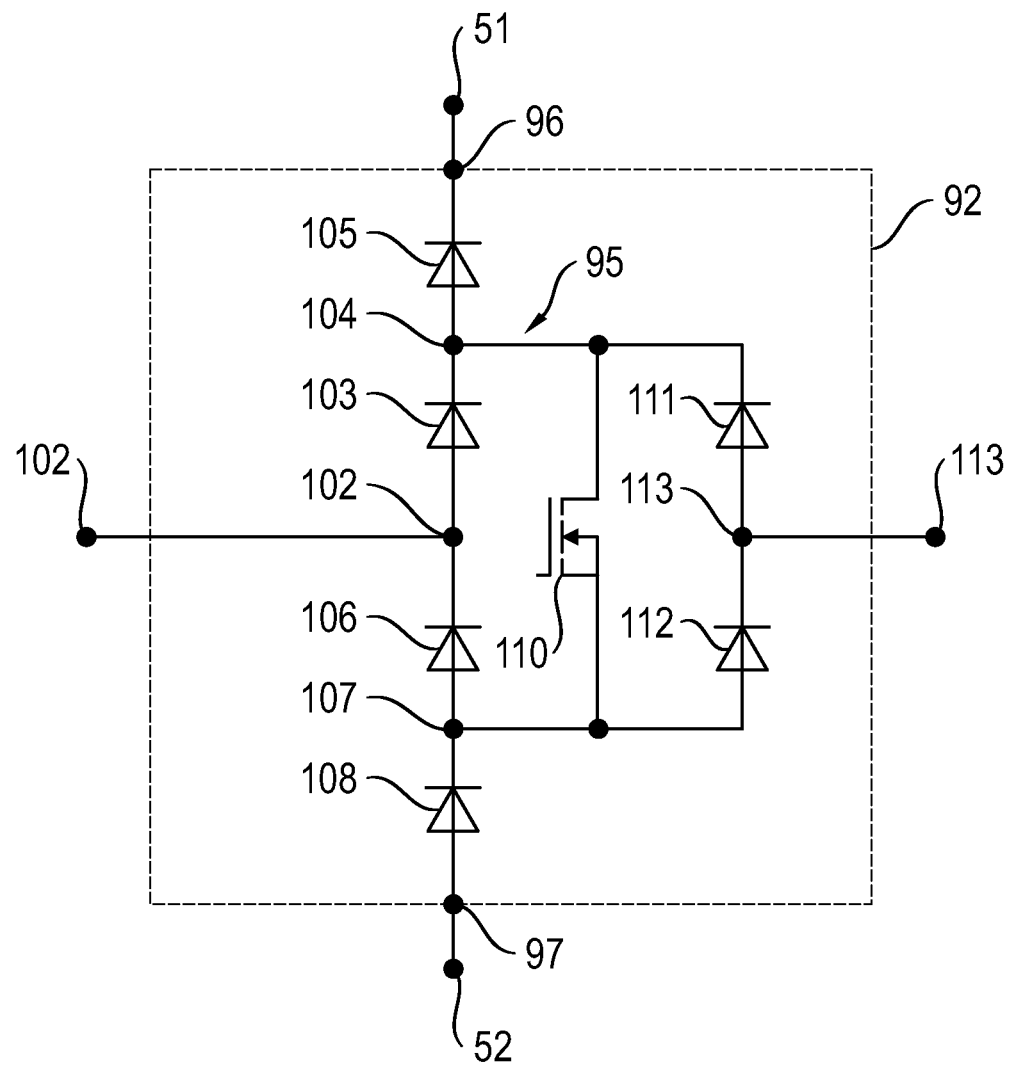
FIG. 7 shows a first embodiment for the changeover arrangement from FIG. 2 or 3.

FIG. 7 shows, by way of example, an embodiment of the changeover arrangement 92. The changeover arrangement 92 is designed like in the case of a Vienna rectifier.

The changeover arrangement 92 has the first changeover arrangement connection 102, the second changeover arrangement connection 113, the first output 96 and the second output 97. The changeover arrangement connections 102, 113 can also be referred to as bridge rectifier connections.

The changeover arrangement 92 has a bridge rectifier 95 and the controllable switch 110, as described in more detail below.

The changeover arrangement connection 102 is connected to a point 104 via a diode 103 (in the forward direction), and the point 104 is connected to the first output 96 via a diode 105. The changeover arrangement connection 102 is connected to a point 107 via a diode 106 (in the reverse direction), and the point 107 is connected to the second output 97 via a diode 108. A controllable switch 110 is provided between the points 107 and 104. The switch 110 is designed as a MOSFET in the exemplary embodiment, but other electronic switches, such as IGBTs, are also for example possible. The changeover arrangement connection 113 is connected to the point 104 via a diode 111 (in the forward direction) and to the point 107 via a diode 112 (in the reverse direction). The cathodes of the diodes 103, 105, 106, 108, 111, 112 are in each case connected on the side toward the first line 51 or the first output 96, and the anodes are in each case connected on the side toward the second line 52 or the second output 97. The method of operation of the Vienna rectifier is described for example in EP 0 660 498 A2.

If the controllable switch 110 is turned off in a first state Z1, the bridge rectifier 95 functions like a normal bridge rectifier. A current can flow from the changeover arrangement connections 102, 113 to the first output 96 via the diodes 103, 105, 111, and a current can flow from the second output 97 to the changeover arrangement connections 102, 113 via the diodes 108, 106, 112 since the corresponding diodes are forward-biased in these directions.

In contrast, if the controllable switch 110 is turned on in a second state Z2, a current can flow from the changeover arrangement connection 102 to the changeover arrangement connection 113 via the diode 103, the controllable switch 110 and the diode 112, or conversely a current can flow from the changeover arrangement connection 113 to the changeover arrangement connection 102 via the diode 111, the controllable switch 110 and the diode 106. Furthermore, a current can also respectively flow from the changeover arrangement connections 102 and/or 113 to the first output 51, and/or a current can flow from the second output 52 to the changeover arrangement connections 102, 113.

Whether a current actually flows depends on the voltage conditions at the changeover arrangement connections 102, 113 and at the outputs 96, 97.

If the diodes 103, 104 are arranged on the side of the coil 91, the diodes 111, 112 may be designed to be weaker than the diodes 103, 104 since they have a lower load.

Figure 8:
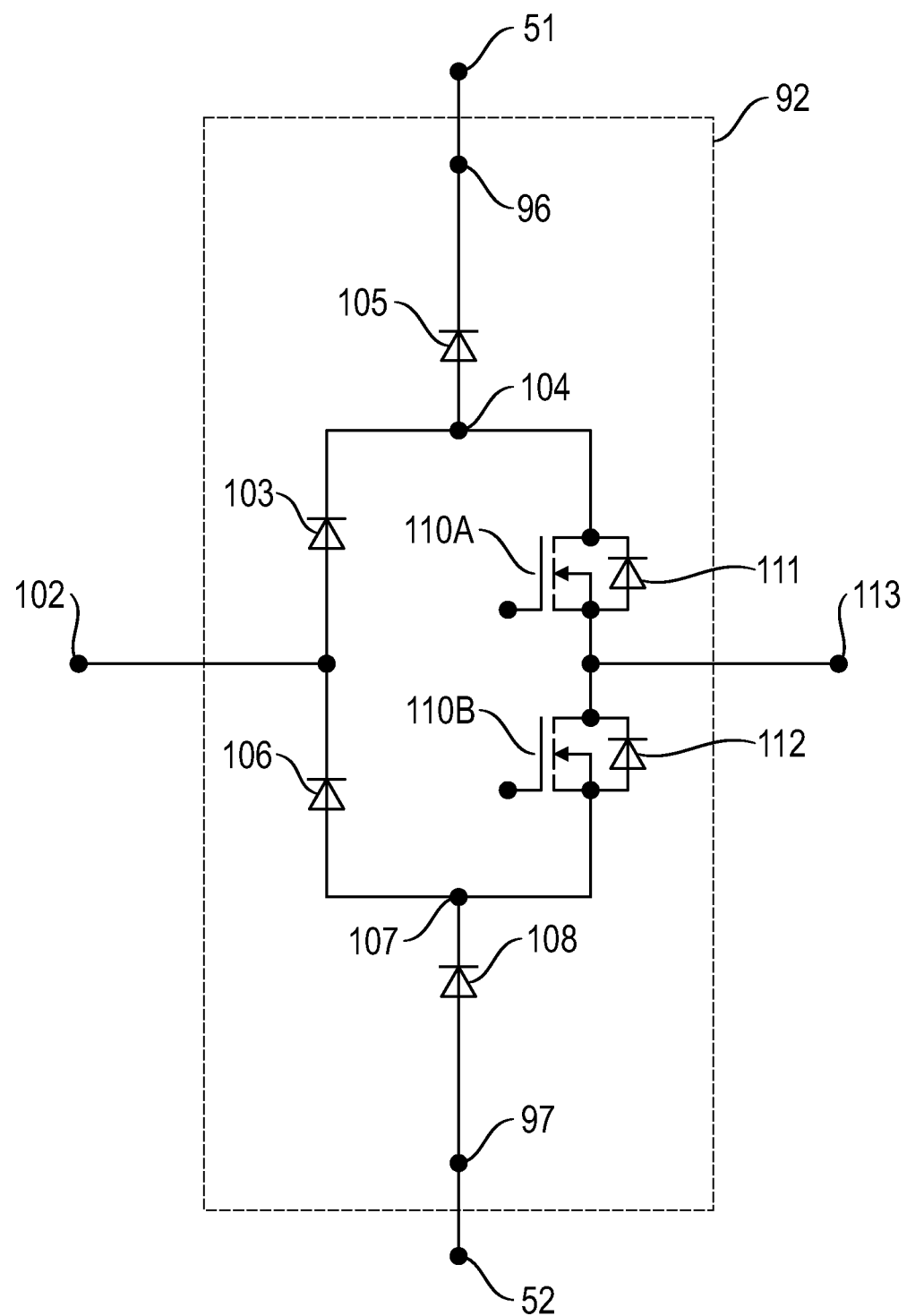
FIG. 8 shows a second embodiment for the changeover arrangement of FIG. 2 or 3.

FIG. 8 shows a further embodiment of the changeover apparatus 92. This changeover apparatus likewise has the changeover arrangement connections 102, 113, the diodes 103, 105, 106, 108, 111 and 112 and the points 104, 107, which are provided with the same reference signs as in FIG. 7. The switch 110 from FIG. 7 has been replaced with two switches 110A, 110B. The switch 110A is (reverse-)connected in parallel with the diode 111, and the switch 110B is (reverse-)connected in parallel with the diode 112. The diodes 111, 112 may be in the form of integrated inverse diodes of the respective semiconductor switch 110A, 110B or a diode which is additionally connected in parallel and preferably has a low forward voltage, for example a Schottky diode. The coil 91 is preferably respectively connected on the side of the bridge rectifier connection 102, with the result that the diodes 103, 106 are on the side of the coil 91. This makes it possible to reduce the current through the switches 110A, 110B and facilitates their commutation. In addition, in this embodiment, it is possible to use switches 110A, 110B without integrated inverse diodes, for example favorable IGBT switches. However, both variants are possible.

In the on, second state Z2, the switch 110A enables a current flow from the point 104 to the changeover arrangement connection 113, and, in the on, second state Z2, the switch 110B enables a current flow from the changeover arrangement connection 113 to the point 107. As a result, less current flows through a diode in comparison with the embodiment from FIG. 7 when current flows between the points 102 and 113, and this reduces the power loss.

In the first, off state of the switches 110A, 110B, the changeover apparatus 92 behaves like the changeover apparatus 92 from FIG. 7. In the second, on state of the switches 110A, 110B, the changeover apparatus 92 enables a current flow from the changeover arrangement connection 102 to the changeover apparatus connection 113 via the diode 103 and the switch 110A and enables a current flow from the changeover arrangement connection 113 to the changeover apparatus connection 102 via the switch 110B and the diode 106. In contrast to the embodiment from FIG. 7, this circuit has lower power losses since two diodes are not connected in series, as in FIG. 7, in the case of a switch 110 which is on.

In contrast to the changeover apparatus 92 from FIG. 7, the changeover apparatus 92 from FIG. 8 is asymmetric with respect to the changeover apparatus connections 102, 113. The changeover apparatus connection 113 can be provided as a bridge rectifier connection 113 assigned to the coil 91, or else the changeover apparatus connection 102. The variant mentioned second (diodes 103, 106 and bridge rectifier connection 102 on the side of the coil 91) has the lower losses at the switches 110A, 110B, thus making it possible to increase the efficiency.

The property of the changeover apparatuses 92 from FIG. 7 and FIG. 8 can be summarized as follows:

The changeover apparatus 92 is designed
to enable a current from the changeover apparatus connection 102 or from the changeover apparatus connection 113 to the line 51,
to enable a current from the line 52 to the changeover apparatus connection 102 or to the changeover apparatus connection 113,
to prevent a current between the changeover apparatus connection 102 and the changeover apparatus connection 113 in a first changeover apparatus state Z1, and
to enable a current between the changeover apparatus connection 102 and the changeover apparatus connection 113 in a second changeover apparatus state Z2.

The changeover apparatus 92 preferably has a bridge rectifier 103, 106, 111, 112 and at least one switch 110 or 110A, 110B, but more complicated circuits with logic modules are also possible.

Figure 9:
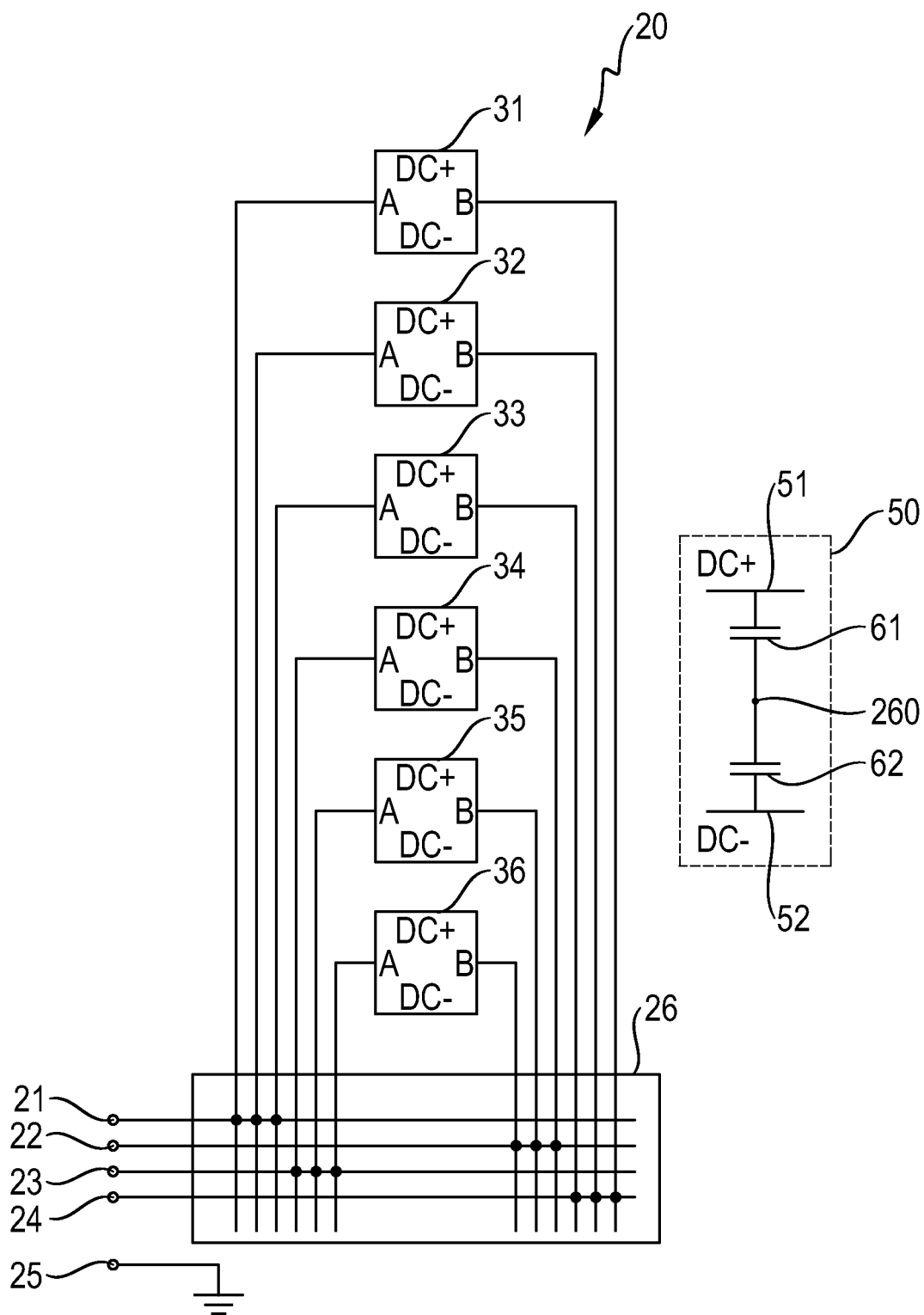
FIG. 9 shows a further embodiment of the rectifier arrangement having an interconnection matrix.

FIG. 9 shows a variant of the rectifier arrangement 20 in which the interconnection apparatus 26 has an interconnection matrix which has a largely free interconnection of the connections 21, 22, 23, 24 to the first circuit arrangement connections A and second circuit arrangement connections B of the circuit arrangements 31 to 36. Such an interconnection apparatus 26 enables each of the configurations which have already been shown and further configurations. The configuration shown corresponds to the configuration from FIG. 6, wherein the switches of the interconnection matrix which are turned on are illustrated as points. As can be seen, switches are required for all possible combinations 48. In contrast, the interconnection apparatus 26 from FIG. 1 requires only six switches 251, 252, 253, 254, 255 and 256.

Numerous variations and modifications are of course possible within the scope of the present invention.

A capacitor—not illustrated—can be connected in parallel with the circuit arrangements 31 to 36 and, as an X capacitor, can act as part of an interference suppression filter.

What is claimed is:

1. A rectifier arrangement (20) for rectifying an AC voltage (L1, L2, L3; HOT1, HOT2) into a DC voltage (DC+, DC−),
the rectifier arrangement (20) has connections (21, 22, 23, 24), circuit arrangements (31, 32, 33, 34, 35, 36), an interconnection apparatus (26) and an intermediate circuit (50),
the connections (21, 22, 23, 24) comprise a first connection (22) and a second connection (21), which intermediate circuit (50) has a first line (51), a second line (52) and at least one capacitor (61, 62) between the first line (51) and the second line (52),
the circuit arrangements (31, 32, 33, 34, 35, 36) each have a first circuit arrangement connection (A) and a second circuit arrangement connection (B), between which a changeover arrangement (92) and a coil (91) connected in series with the changeover arrangement (92) are provided, an order of the changeover arrangement (92) and the coil (91) between the first circuit arrangement connections (A) and the associated second circuit arrangement connections (B) of the circuit arrangements (31, 32, 33, 34, 35, 36) is the same in each case,
the changeover arrangements (92) are interconnected to the first line (51) and to the second line (52), and
the interconnection apparatus (26) is designed to enable at least a first configuration and a second configuration differing from the first configuration,
wherein in the first configuration the first connection (22) is connected to at least one first circuit arrangement connection (A), and in the second configuration the first connection (22) is connected to at least one second circuit arrangement connection (B).

2. The rectifier arrangement of claim 1, wherein an order between the first circuit arrangement connection (A) and the second circuit arrangement connection (B) is as follows:
first circuit arrangement connection (A),
changeover arrangement (92), coil (91),
second circuit arrangement connection (B).

3. The rectifier arrangement of claim 1, wherein an order between the first circuit arrangement connection (A) and the second circuit arrangement connection (B) is as follows:
first circuit arrangement connection (A),
coil (91),
changeover arrangement (92),
second circuit arrangement connection (B).

4. The rectifier arrangement (20) of claim 1, wherein the interconnection apparatus (26) is designed to connect the first connection (22) to plural first circuit arrangement connections (A) in the first configuration, and to connect the first connection (22) to plural second circuit arrangement connections (B) in the second configuration.

5. The rectifier arrangement (20) of claim 1, wherein the interconnection apparatus (26) is designed to connect the first connection (22) to no second circuit arrangement connection (B) in the first configuration.

6. The rectifier arrangement (20) of claim 1, wherein the interconnection apparatus (26) is designed to connect the first connection (22) to no first circuit arrangement connection (A) in the second configuration.

7. The rectifier arrangement of claim 1, having an even number of the circuit arrangements (31-36), and wherein the interconnection apparatus (26) is designed to connect the first connection (22) to the second circuit arrangement connections (B) of half of the circuit arrangements (31-36) in the second configuration.

8. The rectifier arrangement (20) of claim 1, in which the interconnection apparatus (26) is designed to connect the second connection (21) either solely to at least one first circuit arrangement connection (A) or solely to at least one second circuit arrangement connection (B) in the first configuration and in the second configuration.

9. The rectifier arrangement of claim 1, wherein the circuit arrangements (31-36) have at least two first circuit arrangements (31, 32, 33) and at least two second circuit arrangements (34, 35, 36), wherein
the second circuit arrangement connections (B) of the first circuit arrangements (31, 32, 33) are connected electrically to one another at a first point (134),
the second circuit arrangement connections (B) of the second circuit arrangements (34, 35, 36) are connected electrically to one another at a second point (257), and
the interconnection apparatus (26) is designed to enable either an electrical connection of the first point (134) and the second point (257) or a disconnection of this electrical connection.

10. The rectifier arrangement of claim 1, having at least six circuit arrangements (31-36), and the connections (21, 22, 23, 24) comprise a third connection (23) and a fourth connection (24).

11. The rectifier arrangement of claim 10, wherein the interconnection apparatus (26) is designed to enable a third configuration that corresponds to the first configuration, wherein the first connection (22), the second connection (21) and the third connection (23) are connected respectively to at least two first circuit arrangement connections (A), and wherein the fourth connection (24) is connected to at least six second circuit arrangement connections (B).

12. The rectifier arrangement of claim 10, wherein the interconnection apparatus (26) is designed to enable a fourth configuration that corresponds to the second configuration, wherein the first connection (22) and the third connection (23) are connected to in each case at least three first circuit arrangement connections (A), and the second connection (21) and the fourth connection (24) are connected to in each case at least three second circuit arrangement connections (B).

13. The rectifier arrangement of claim 1, wherein the changeover arrangement (92) has a diode (111; 112) and a semiconductor switch (110A; 110B) reverse-connected in parallel with the diode to enable a current flow in one direction via the diode (111; 112) and to enable a current flow in an opposite, second direction via the semiconductor switch (110A; 110B).

14. The rectifier arrangement of claim 1, wherein the interconnection apparatus (26) is in the form of an interconnection matrix to enable, in addition to the first configuration and the second configuration, at least one further different configuration.

\* \* \* \* \*